(12) United States Patent
Aritsuka et al.

(10) Patent No.: US 7,016,812 B2
(45) Date of Patent: Mar. 21, 2006

(54) APPARATUS AND CONTROL METHOD FOR INTELLIGENT SENSOR DEVICE

(75) Inventors: Toshiyuki Aritsuka, Kodaira (JP); Kei Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/702,481

(22) Filed: Nov. 7, 2003

(65) Prior Publication Data

US 2005/0021296 A1    Jan. 27, 2005

(30) Foreign Application Priority Data

Jul. 9, 2003    (JP) .............................. 2003-194006

(51) Int. Cl.
*G06F 19/00*    (2006.01)

(52) U.S. Cl. ...................... 702/188; 702/122; 702/182; 482/8

(58) Field of Classification Search ................ 702/122, 702/182, 188; 482/8; 709/220–253
See application file for complete search history.

(56) References Cited

U.S. PATENT DOCUMENTS

| | | | | |
|---|---|---|---|---|
| 6,749,537 B1 * | 6/2004 | Hickman | ........................ | 482/8 |
| 6,808,472 B1 * | 10/2004 | Hickman | ........................ | 482/8 |
| 6,826,607 B1 * | 11/2004 | Gelvin et al. | ................. | 709/224 |
| 2002/0187025 A1 * | 12/2002 | Speasl et al. | ................ | 414/287 |
| 2003/0172940 A1 * | 9/2003 | Rogers et al. | ............... | 128/899 |
| 2004/0098395 A1 * | 5/2004 | Hisano | ......................... | 707/100 |
| 2004/0100394 A1 * | 5/2004 | Hitt | ......................... | 340/870.11 |
| 2004/0139110 A1 * | 7/2004 | LaMarca et al. | .......... | 707/104.1 |
| 2004/0218602 A1 * | 11/2004 | Hrastar | ........................ | 370/390 |
| 2004/0249590 A1 * | 12/2004 | Ota et al. | ...................... | 702/79 |
| 2004/0254652 A1 * | 12/2004 | Ota et al. | ...................... | 700/12 |

FOREIGN PATENT DOCUMENTS

JP    10-242443    2/1997

* cited by examiner

*Primary Examiner*—Carol S. W. Tsai
(74) *Attorney, Agent, or Firm*—Reed Smith LLP; Stanley P. Fisher, Esq.; Juan Carlos A. Marquez, Esq.

(57) ABSTRACT

An intelligent sensor device and a method for controlling an intelligent sensor device are provided. In one example, the sensor device includes a memory; a radio frequency communicator configured to receive signals from and transmit signals to an external device having an external application; a radio frequency controller configured to control the radio frequency communicator; a processor; a process controller configured to instruct the processor to load one or more scripts into the memory; one or more sensors; and a sensor driver controller configured to activate one or more appropriate sensors based on a request received from the external application, wherein the process controller is further configured to instruct the processor to execute an appropriate script based on the request received from the external application.

20 Claims, 12 Drawing Sheets

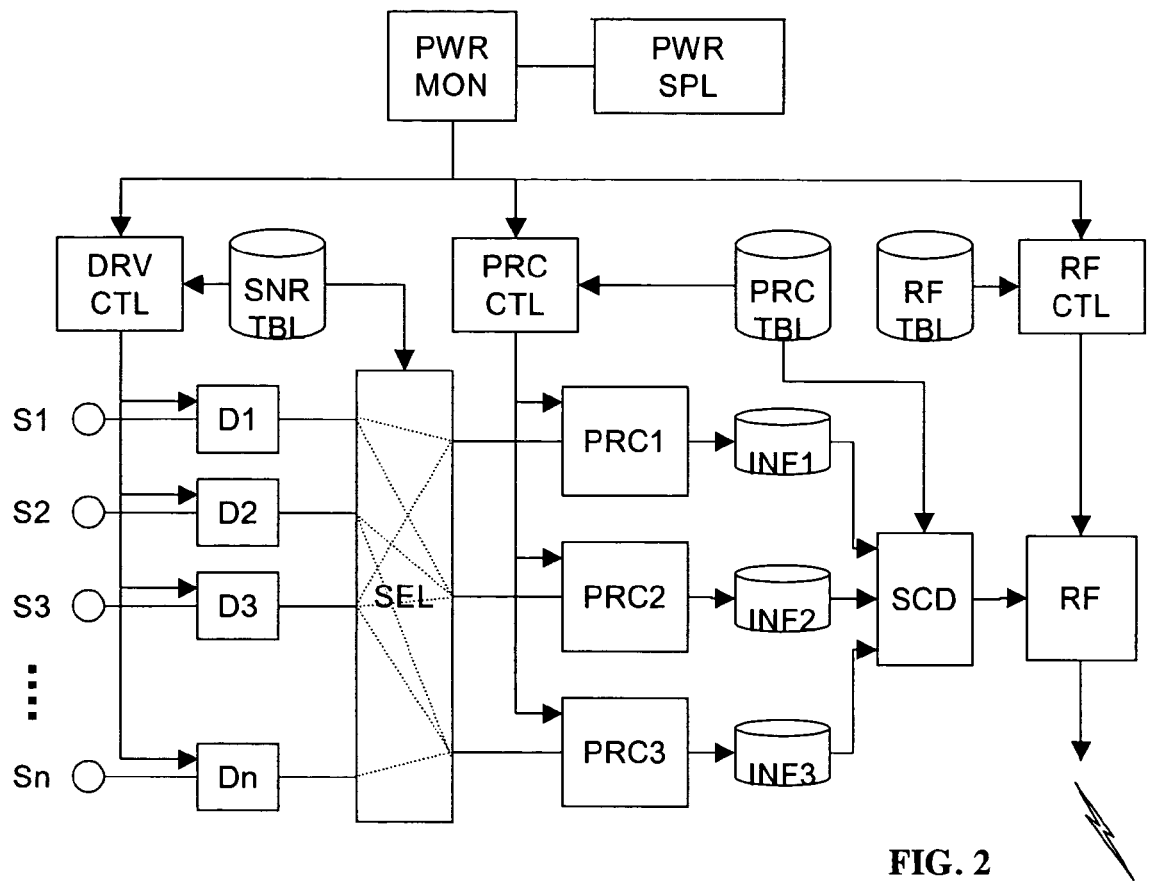
FIG. 2
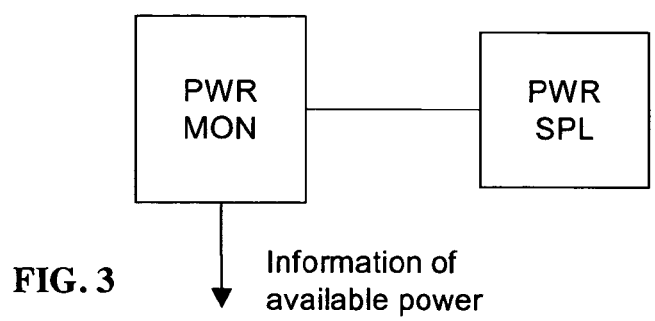
FIG. 3   Information of available power

| sensor ID | max. freq. | freq. | max. accuracy | accuracy |
|---|---|---|---|---|
| 1 | 50 Hz | 10 Hz | 16 bit | 16 bit |
| 2 | 10 Hz | 1 Hz | 32 bit | 16 bit |
| 3 | 1000 Hz | 50 Hz | 8 bit | 8 bit |
| . | . | . | . | . |
| . | . | . | . | . |
| . | . | . | . | . |
| n | 100 Hz | on demand | 16 bit | 8 bit |

FIG. 4A SNRTBL (determined)

| sensor ID | required freq. | required accuracy |
|---|---|---|
| 1 | 10 Hz | 16 bit |
| 2 | (no use) | (no use) |
| 3 | 25 Hz | 16 bit |
| . | . | . |
| . | . | . |
| . | . | . |
| n | (no use) | 8 bit |

FIG. 4B SNRTBL (for process 1)

| sensor ID | required freq. | required accuracy |
|---|---|---|
| 1 | 5 Hz | 8 bit |
| 2 | 1 Hz | 8 bit |
| 3 | 10 Hz | 8 bit |
| . | . | . |
| . | . | . |
| . | . | . |
| n | (no use) | (no use) |

FIG. 4C SNRTBL (for process 2)

| sensor ID | required freq. | required accuracy |
|---|---|---|
| 1 | (no use) | (no use) |
| 2 | 1 Hz | 16 bit |
| 3 | 50 Hz | 8 bit |
| . | . | . |
| . | . | . |
| . | . | . |
| n | on demand | 8 bit |

FIG. 4D SNRTBL (for process 3)

| process ID | applied function | applied param. | sensors | transmission interval |
|---|---|---|---|---|
| 1 | FNC1 | PRM1 | S1, S2 | 10Hz |
| 2 | FNC7 | PRM4 | S1,S2,S3 | 1Hz |
| 3 | FNC10 | PRM8 | S2,S3,Sn | 100Hz |

FIG. 7A PRCTBL (determined)

| available functions (MIPS) | required function | available params. | required params. | required sensors | required transmission interval |
|---|---|---|---|---|---|
| FNC1(1)<br>FNC2(2)<br>FNC3(4)<br>FNC4(8) | FNC1 | PRM1<br>PRM2<br>PRM3 | PRM2 | S1<br>S2 | 10Hz |

FIG. 7B PRCTBL (for process 1)

| available functions (MIPS) | required function | available params. | required params. | required sensors | required transmission interval |
|---|---|---|---|---|---|
| FNC5(5)<br>FNC6(10)<br>FNC7(8) | FNC6 | PRM4<br>PRM5<br>PRM6 | PRM4 | S1<br>S2<br>S3 | 1Hz |

FIG. 7C PRCTBL (for process 2)

| available functions (MIPS) | required function | available params. | required params. | required sensors | required transmission interval |
|---|---|---|---|---|---|
| FNC8(1)<br>FNC9(2)<br>FNC10(3) | FNC10 | PRM7<br>PRM8 | PRM7 | S2<br>S3<br>Sn | 100Hz |

FIG. 7D PRCTBL (for process 3)

FIG. 12 RFTBL (determined)

APPARATUS AND CONTROL METHOD FOR INTELLIGENT SENSOR DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to sensor network systems and, more particularly, to small sensor devices and methods for controlling small sensor devices in order to increase efficiency of the sensor network system.

2. Discussion of Background

A sensor network system consists of pervasive sensor devices attached to a multitude of different environments in our everyday world. These environments include humans, buildings, commodities, etc. In a human, for example, a sensor device may monitor heart rate, temperature, acceleration, movement of limbs, and emergency situations. In a building, for example, a sensor device may monitor seismic data, movement of structural supports, fires, and floods.

A conventional sensor network system includes sensor devices, which include individual sensors to collect sensed data from the environment in which the sensors are placed; and external applications, which reside in external devices and communicate with sensor devices via radio frequency wireless communication. Examples of an external device include a laptop computer, a personal computer, and a cellular phone. The sensors in the sensor devices collect sensed data from attached targets according to an external request from an external application. The sensed data is then sent back to the external device through wireless communication. The sensor device transmits sensed data in one format back to the external devices. The sensor device may communicate with many different external devices concurrently.

Unfortunately, sensed data that is compatible with one particular external application may not be compatible with another external application. Another problem is that power consumption requirements may be different amongst different external applications. A conventional sensor device cannot change levels of performance to match a particular application. Still another problem is that conventional sensor devices do not encode data for security before transmitting the sensed data. Also, sensor devices do not compress sensed data before the sensed data is transmitted back to the external devices. These problems combine to make the sensor network system inefficient and unduly costly to operate.

SUMMARY OF THE INVENTION

It has been recognized that what is needed is a sensor network system that provides universal compatibility amongst different external devices, power consumption control of sensor device components, processing capabilities at the sensor device, encoding of processed information, and compression of processed information. Broadly speaking, the present invention fills these needs by providing an intelligent sensor device and a method for controlling an intelligent sensor device. It should be appreciated that the present invention can be implemented in numerous ways, including as a process, an apparatus, a system, a device or a method. Several inventive embodiments of the present invention are described below.

In one embodiment, a method is provided for controlling a sensor device. The method comprises loading one or more scripts into a memory of the sensor device; receiving a request from an external application; activating one or more appropriate sensors based on the request from the external application; receiving sensed data from the one or more appropriate sensors; and executing an appropriate loaded script based on the request from the external application.

In another embodiment, a sensor device is provided comprising a memory; a radio frequency communicator configured to receive signals from and transmit signals to an external device having an external application; a radio frequency controller configured to control the radio frequency communicator; a processor; and a process controller configured to instruct the processor to load one or more scripts into the memory; one or more sensors; and a sensor driver controller configured to activate one or more appropriate sensors based on a request received from the external application, wherein the process controller is further configured to instruct the processor to execute an appropriate script based on the request received from the external application.

In still another embodiment, a computer-readable medium is provided for carrying one or more sequences of one or more instructions for controlling a sensor device, the one or more sequences of one or more instructions including instructions which, when executed by one or more processors, cause the one or more processors to perform the steps of loading one or more scripts into a memory of the sensor device; receiving a request from an external application to obtain particular sensor information; activating one or more appropriate sensors based on the request from the external application; receiving sensed data from the one or more appropriate sensors; and executing an appropriate loaded script based on the request from the external application.

Advantageously, the sensor device of the present invention allows sensed data to be compatible with many different external applications. Different power consumption requirements amongst the different external applications can also be satisfied. Accordingly, the present sensor device can change levels of performance to match requirements of particular external applications. The sensor device of the present invention can also be configured to compress and encode processed information before transmission. Thus, the sensor device of the present invention operates at a high efficiency, is intelligent, and contributes to making a sensor network system inexpensive to operate.

The invention encompasses other embodiments of a method, a system, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 2 is a more detailed block diagram of hardware of a sensor device, in accordance with an embodiment of the present invention;

FIG. 3 is a block diagram of the power supply and power monitor, in accordance with an embodiment of the present invention;

FIG. 4A is an example of a sensor control parameter table, in accordance with an embodiment of the present invention;

FIG. 4B is a sensor control parameter table for an individual process, in accordance with an embodiment of the present invention;

FIG. 4C is a sensor control parameter table for an individual process, in accordance with an embodiment of the present invention;

FIG. 4D is a sensor control parameter table for an individual process, in accordance with an embodiment of the present invention;

FIG. 7A is a process controlling parameter table PRCTBL, in accordance with one embodiment of the present invention;

FIG. 7B is a process controlling parameter table for an individual process, in accordance with one embodiment of the present invention;

FIG. 7C is a process controlling parameter table for an individual process, in accordance with one embodiment of the present invention;

FIG. 7D is a process controlling parameter table for an individual process, in accordance with one embodiment of the present invention;

FIG. 12 is a controlling parameter table, in accordance with an embodiment of the present invention;

DESCRIPTION OF THE PREFERRED EMBODIMENTS

An invention for an intelligent sensor device and a method for controlling an intelligent sensor device is disclosed. Numerous specific details are set forth in order to provide a thorough understanding of the present invention. It will be understood, however, to one skilled in the art, that the present invention may be practiced without some or all of these specific details.

Figure 1:
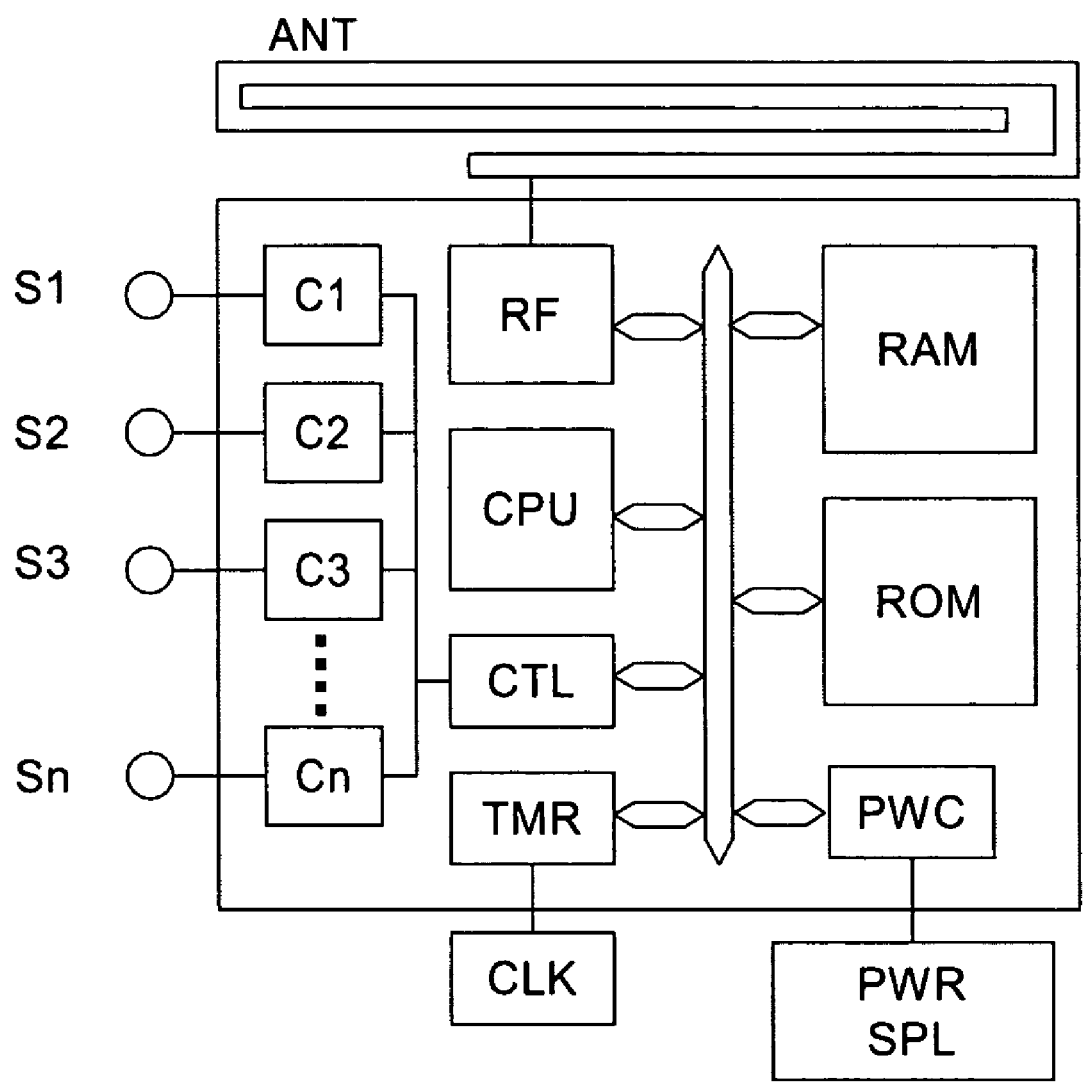
FIG. 1 is a block diagram of hardware of a sensor device, in accordance with an embodiment of the present invention.

FIG. 1 is a block diagram of hardware of a sensor device, in accordance with an embodiment of the present invention.

The sensor device includes one or more sensors S1, S2, S3, . . . Sn, where n is a positive integer. The sensors S1 . . . Sn are configured to sense environmental conditions, such as body temperature, air temperature, limb movement, posture, seismic data, acceleration, velocity, vibrations, heart rate, blood pressure, fire, water, humidity, precipitation, toxic chemicals, radio active conditions, harmful chemicals, non-harmful chemicals, fumes, smoke, altitude, compass direction, ultra violet rays, oxygen content, carbon monoxide content, structural movement in buildings, etc.

Data converters C1 . . . Cn are connected to sensors S1 . . . Sn, respectively. An example of a data converter is an analog to digital converter. The data converters C1 . . . Cn are controlled by an input port controller CTL. Central processing unit CPU is provide to execute program instructions. Memory includes random access memory RAM, which loads programs and data for execution by the CPU, and read only memory ROM, which stores programs and initial data. Radio frequency communication port RF allows wireless communication with an external device. Note, however, that the present invention is not limited to wireless communication. The present invention may be implemented using wired communication as well.

Signals are received and transmitted through the antenna ANT connected to the communication port RF. Timer TMR is provided to control periodical processes. Clock CLK is provided for synchronization of hardware processes. Power controller PWC monitors power status and controls voltage of the sensor device. Power supply PWRSPL, such as a battery or power generator, provides power to the sensor device. The overall dimensions of the sensor device of FIG. 1 are 1 cm×1 cm×0.3 cm. However, a sensor device is not so limited, and may be larger or smaller in overall size.

FIG. 2 is a more detailed block diagram of hardware of a sensor device, in accordance with an embodiment of the present invention. Sensor drivers D1 . . . Dn control data sampling and sensed data conversion. The sensor drivers D1 . . . Dn are preferably software applications, but may be hardware. Power supply monitor PWRMON monitors available power of a power supply, such as a battery or power generator. Sensor driver controller DRVCTL controls driving parameters, such as sampling frequencies and sensed data accuracy of the sensors S1 . . . Sn depending on power conditions and hardware abilities of the sensor device. Sensor controller parameter table SNRTBL stores sampling frequencies and data accuracy for given power supply levels.

Sensed data selector SEL selects sensors S1 . . . Sn that each process requires and connects the output of the sensors S1 . . . Sn to the appropriate process, which may be a loaded script for example. Processes PRC1 . . . PRCn process sensed data to obtain processed information INF1 . . . INFn. The processed information INF1 . . . INFn may be compressed, encoded, and transmitted to an external device having an external application. Process controller PRCCTL controls processes executable by the CPU according to performance parameters, such as power conditions. Process controlling parameter table PRCTBL stores function procedures and execution parameters. Scheduler SCD schedules processed information to be sent to external applications. Radio frequency communicator RF sends the processed information to the external applications according to the schedule via radio frequency. Radio frequency controller RFCTL controls transmission power and transmission rate (e.g., bit per second, or bps) according to performance parameters, such as available power. Radio frequency transmission parameters table RFTBL stores transmission powers, transmission rates, and transmission intervals for given performance parameters.

FIG. 3 is a block diagram of the power supply and power monitor, in accordance with an embodiment of the present invention. Power supply monitor PWRMON monitors the available power of the power supply PWRSPL. For example, PWRMON may monitor available power by measuring a supplied voltage from the power supply PWRSPL. Power supply monitor PWRMON then sends power monitoring information to other components, such as sensor driver controller DRVCTL, process controller PRCCTL, and radio frequency controller RFCTL.

FIG. 4A is an example of a sensor control parameter table SNRTBL, in accordance with an embodiment of the present invention.

FIG. 4B to FIG. 4D are sensor control parameter tables of individual processes, in accordance with an embodiment of the present invention. Maximum frequencies and accuracies are initially set considering hardware abilities and available power.

Each sensor's sampling frequency and data accuracy are determined to be less than either a predetermined maximum value or a required value from that sensor, whichever is lower. The sensor control parameter table SNRTBL of FIG. 4A is constructed by the sensor driver controller DRVCTL using information from the sensor control parameter tables of FIG. 4B to FIG. 4D. The sensor control parameter tables of FIG. 4B to FIG. 4D may include requirements found in loaded scripts or requirements of external applications. If information in FIG. 4B to FIG. 4D changes, the sensor control parameter table SNRTBL of FIG. 4A will be updated accordingly. As an example, when available power gets relatively low, sensor driver controller DRVCTL changes sample frequency and data accuracy accordingly.

Figure 5:
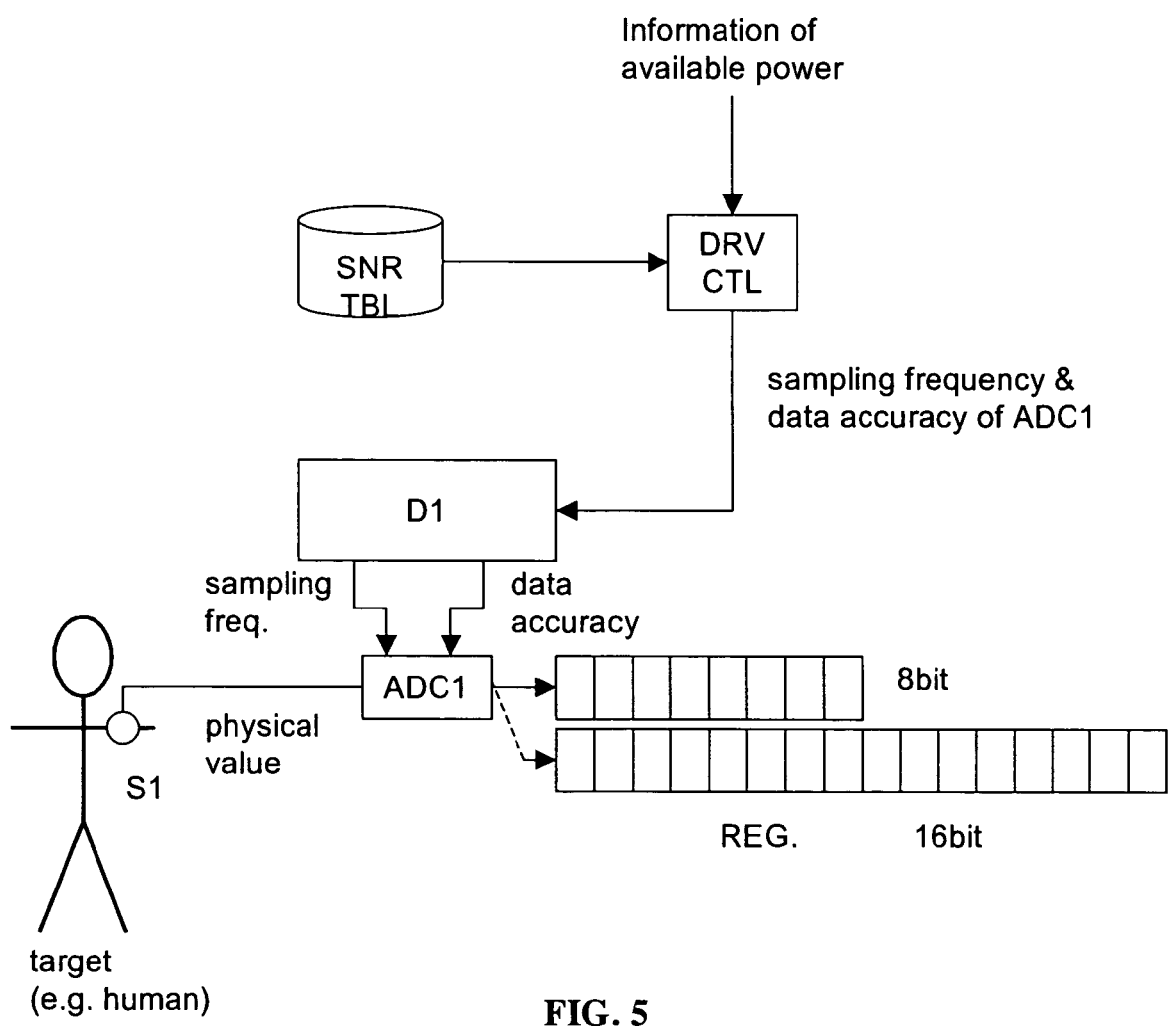
FIG. 5 is a schematic diagram of operations of analog to digital converter, in accordance with an embodiment of the present invention.

FIG. 5 is a schematic diagram of operations of analog to digital converter ADC, in accordance with an embodiment of the present invention. In this example, sensor driver D1 drives analog to digital converter ADC according to a predetermined sampling frequency and stores converted sensed data into register REG. The require size of the register REG is determined by sensor driver controller DRVCTL. Other drivers D2 . . . Dn work in a similar manner.

Figure 6:
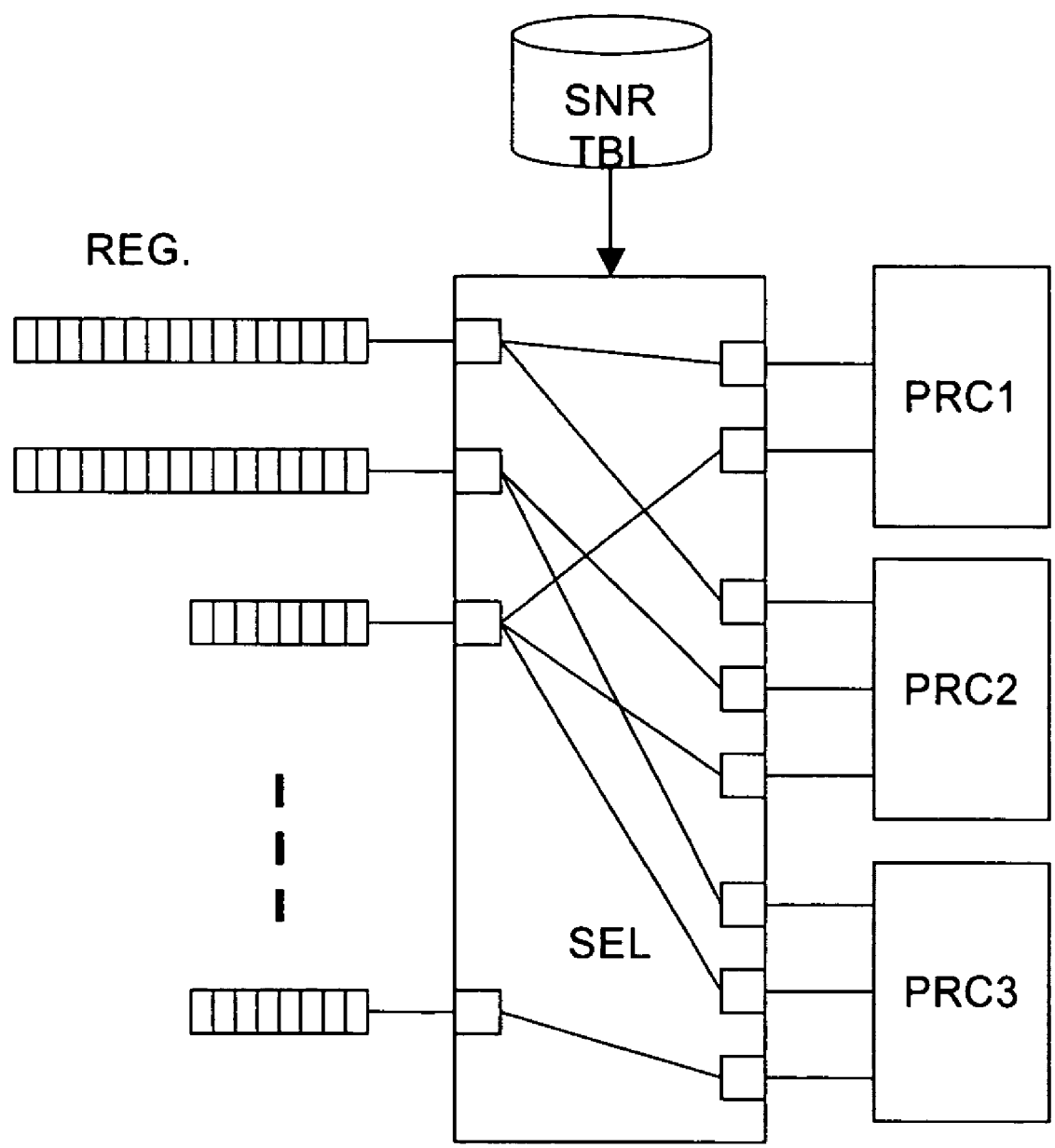
FIG. 6 is a schematic diagram of a sensed data selector, in accordance with an embodiment of the present invention.

FIG. 6 is a schematic diagram of a sensed data selector SEL, in accordance with an embodiment of the present invention. Registers, which store converted data, are connected to the ports in the sensed data selector SEL. Each port is connected to an appropriate process PRC1 . . . PRCn. Rules for selection are described in sensor parameter table SNRTBL.

FIG. 7A is a process controlling parameter table PRCTBL, in accordance with one embodiment of the present invention.

FIG. 7B to FIG. 7D are process controlling parameter tables for individual processes, in accordance with one embodiment of the present invention. Process controlling parameter table PRCTBL stores function programs FNC1 . . . FNCn and parameter sets PRM1 . . . PRMn to be used for sensed data processing. Functions FNC1 . . . FNCn and parameters PRM1 . . . PRMn used in processing scripts are determined by process controller PRCCTL. These processing scripts are loaded scripts in memory. Process controller PRCCTL considers performance parameters, such as performance of CPU, power consumption, and transmission ability.

Figure 8:
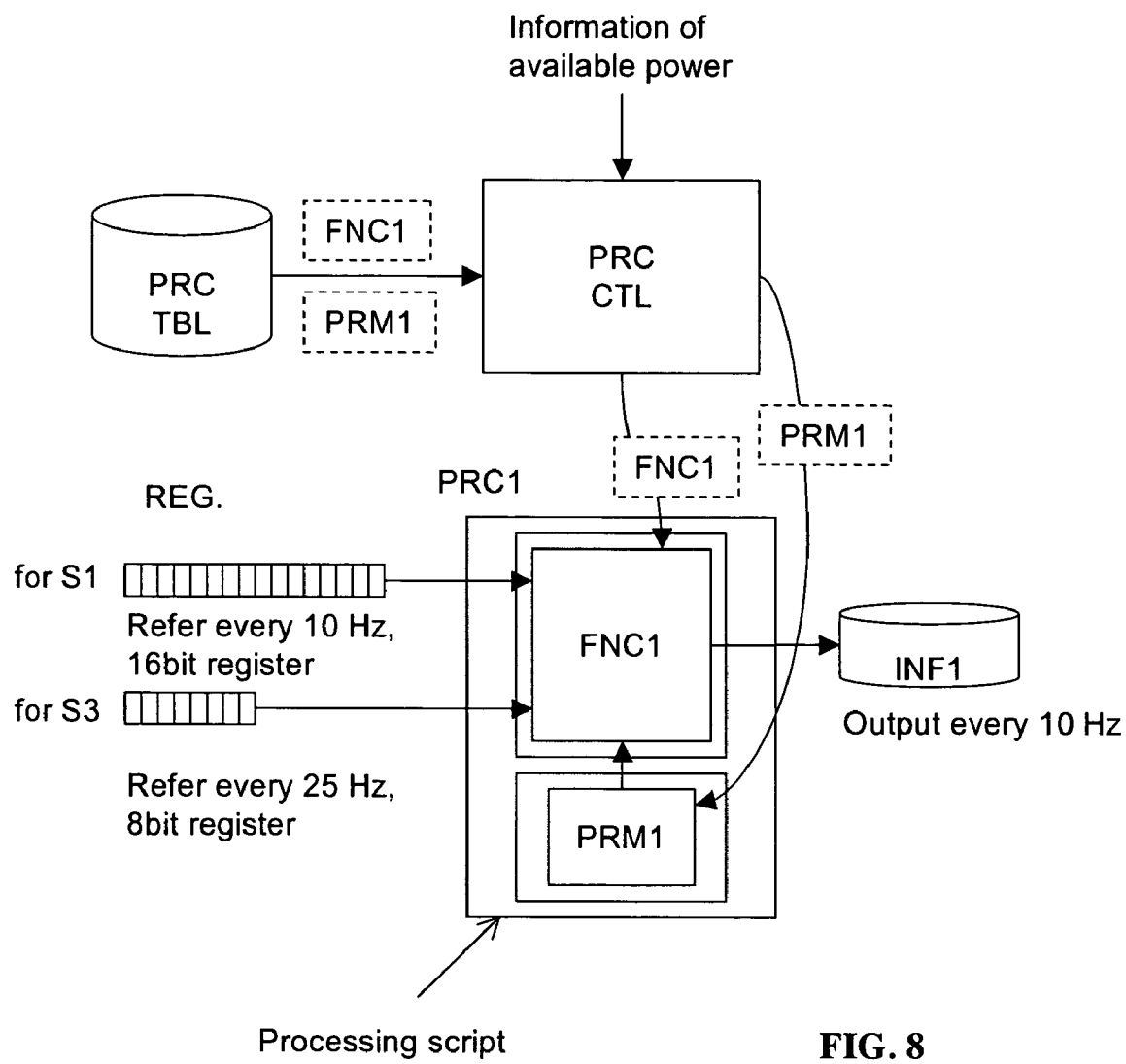
FIG. 8 is a schematic diagram of a process controller, in accordance with an embodiment of the present invention.

FIG. 8 is a schematic diagram of a process controller PRCCTL, in accordance with an embodiment of the present invention. Processes PRC1 . . . PRCn include loaded scripts, use of which are controlled by process controller PRCCTL. In this example, PRC1 has a script that executes a function FNC1 using a parameter set PRM1 with sensed data as inputs. FNC1 and PRM1 are set by process controller PRCCTL, which selects them by referring to process controlling parameter table PRCTBL. In this example, sensed data for sensor S1 is stored in a 16 bit register and refreshed at a rate of 10 Hz. Function FNC1 refers to the register for sensed data for sensor S3 at a rate of 25 Hz. Function FNC1 processes the sensed data and calculates the information INF1 at a rate of 10 Hz to send processed information to the external application. Process scripts, function programs, and parameter sets can be loaded (initially or when the status changes) from an external application via wireless radio frequency communication.

Figure 9:
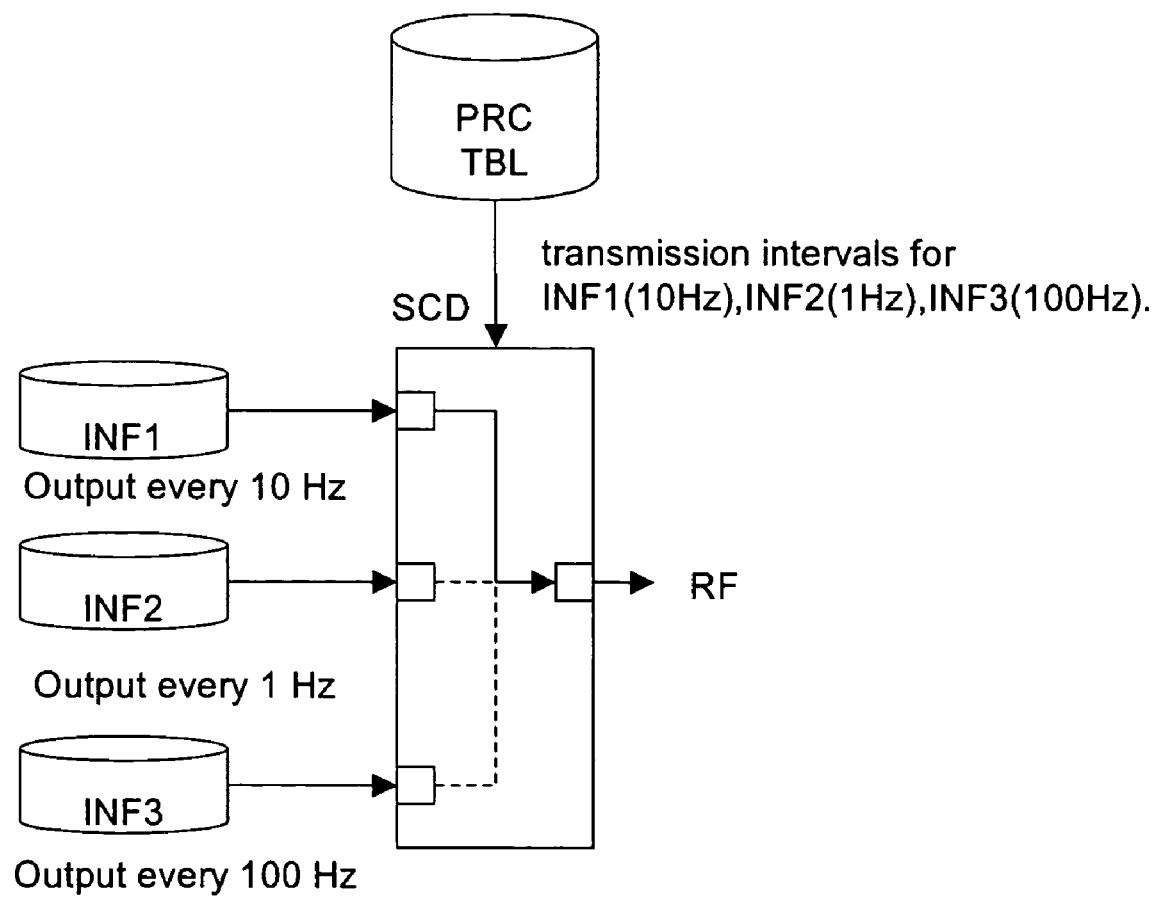
FIG. 9 is a schematic diagram of operations of a scheduler, in accordance with an embodiment of the present invention.

FIG. 9 is a schematic diagram of operations of a scheduler SCD, in accordance with an embodiment of the present invention. In this example, processes PRC1, PRC2 and PRC3 output processed information INF1, INF2 and INF3 at a rate of 10 Hz, 1 Hz and 100 Hz, respectively. Scheduler SCD schedules processed information INF1 . . . INFn to be sent to external applications.

Figure 10:
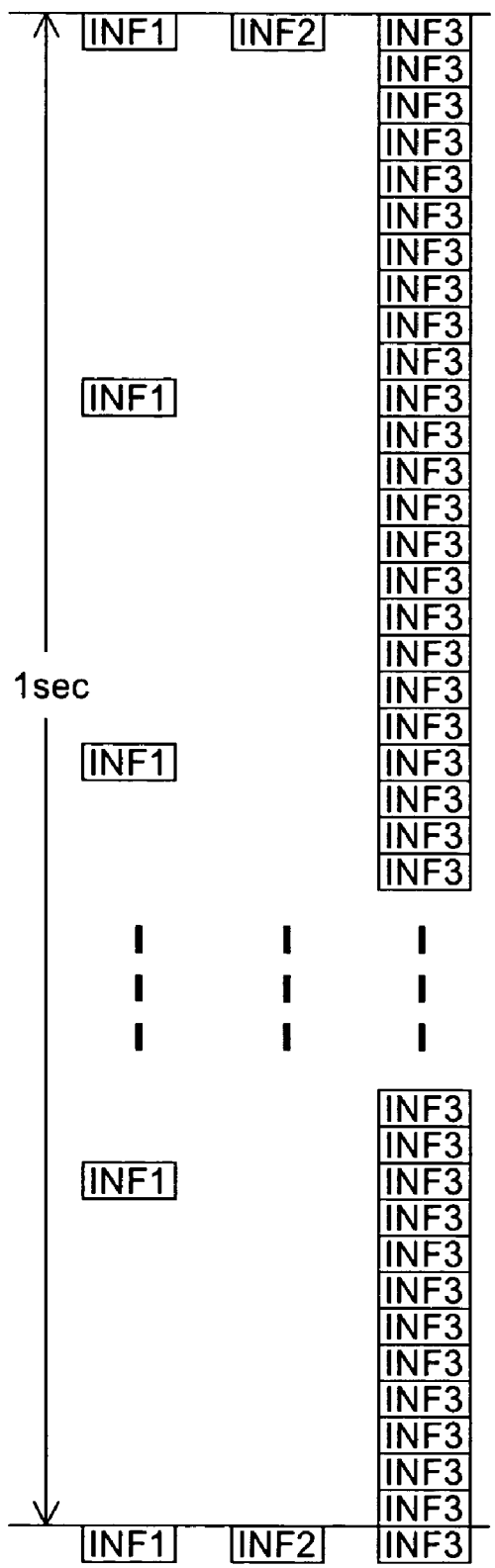
FIG. 10 is a schedule used by scheduler to time transmissions of processed information, in accordance with an embodiment of the present invention.

FIG. 10 is a schedule used by scheduler SCD to time transmissions of processed information INF1 . . . INFn, in accordance with an embodiment of the present invention. According to this schedule example, scheduler SCD will send processed information INF1 10 times per second to radio frequency controller RF; scheduler SCD will send processed information INF2 once per second to radio frequency controller RF; and scheduler SCD will send processed information INF3 100 times per second to radio frequency controller RF. In this example, radio transmission rate is supposed to be high enough to be able to process the above transmissions.

Effective transmission rate, measured in bits per second (bps), depends on the required transmission power for sending data and the data resending frequency to compensate transmission errors. When the distance between the sensor device and the receiver device is relatively long, more transmission power is required for sending data. Since the power consumption is proportional to the product of the transmission power and the transmission time, the transmission rate should be reduced to increase the transmission power.

When transmission errors happen frequently, the effective transmission rate will be reduced because the data to transmit increases to compensate the failure by resending data. In a case when the radio transmission rate is lower than the necessary rate, some parts of the processed information data are transmitted within the available rate and the rest of the data is stored into the memory of the sensor device. In an extreme case when there is no receiver device that is near enough to be able to get data, all processed information data is stored into the memory. When the conditions of the radio transmission recover and there are enough margins in the transmission rate (higher than required), scheduler SCD sends stored data as well as newly processed information data at a higher transmission rate.

If normal operating conditions do not return before the memory is full, older data is thrown away. In such a case, all data should have time stamps in order to inform external applications know when the data is processed.

Figure 11:
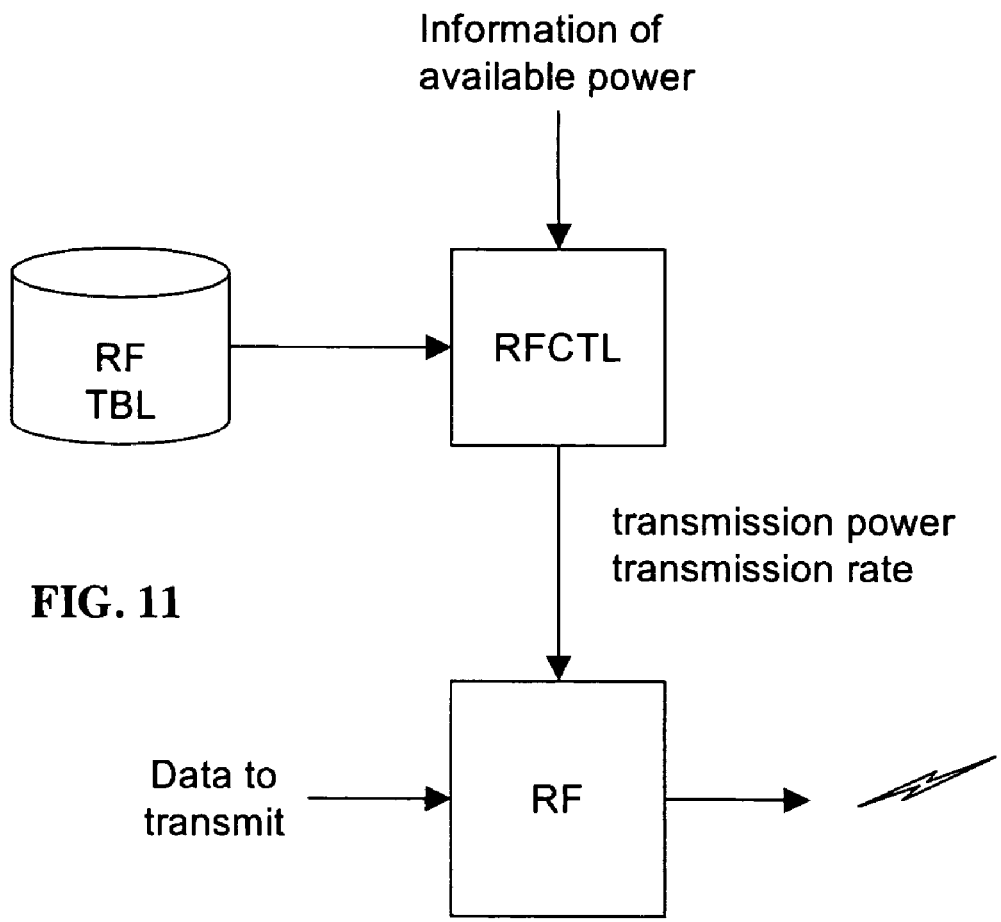
FIG. 11 is a schematic diagram of operations of a radio frequency controller, in accordance with an embodiment of the present invention

FIG. 11 is a schematic diagram of operations of a radio frequency controller RFCTL, in accordance with an embodiment of the present invention. Radio frequency controller RFCTL controls the transmission power and the transmission rate of radio frequency communicator RF. Transmission power and transmission rate to be used are stored in radio frequency controlling parameter table RFTBL.

FIG. 12 is a controlling parameter table RFTBL, in accordance with an embodiment of the present invention. The parameters are determined by radio frequency controller RFCTL considering available power supply, transmission distance between the sensor device and the external device, and hardware ability of the sensor device.

Figure 13:
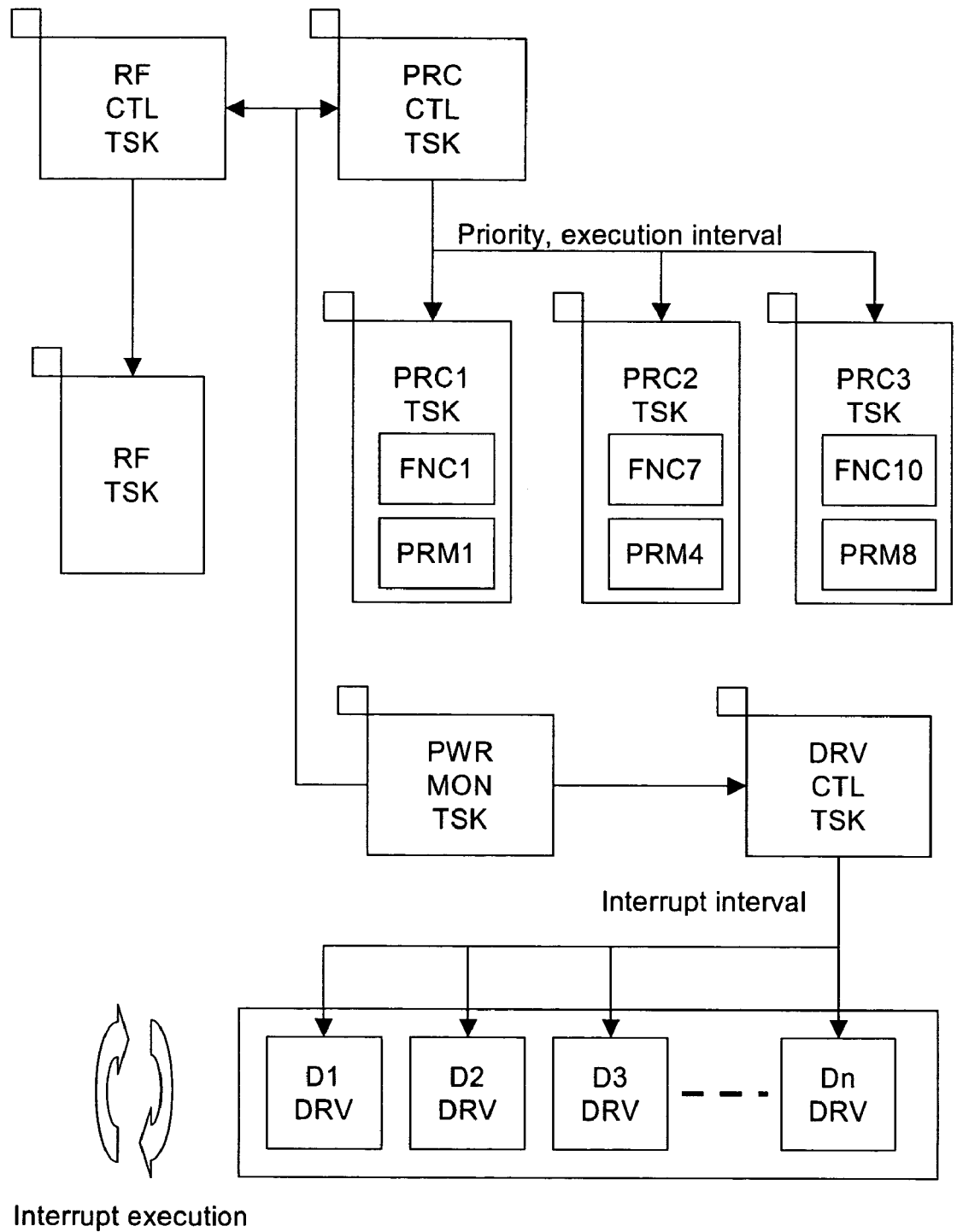
FIG. 13 is a block diagram of software implementation of a sensor control method, in accordance with one embodiment of the present invention.
Figure 14:
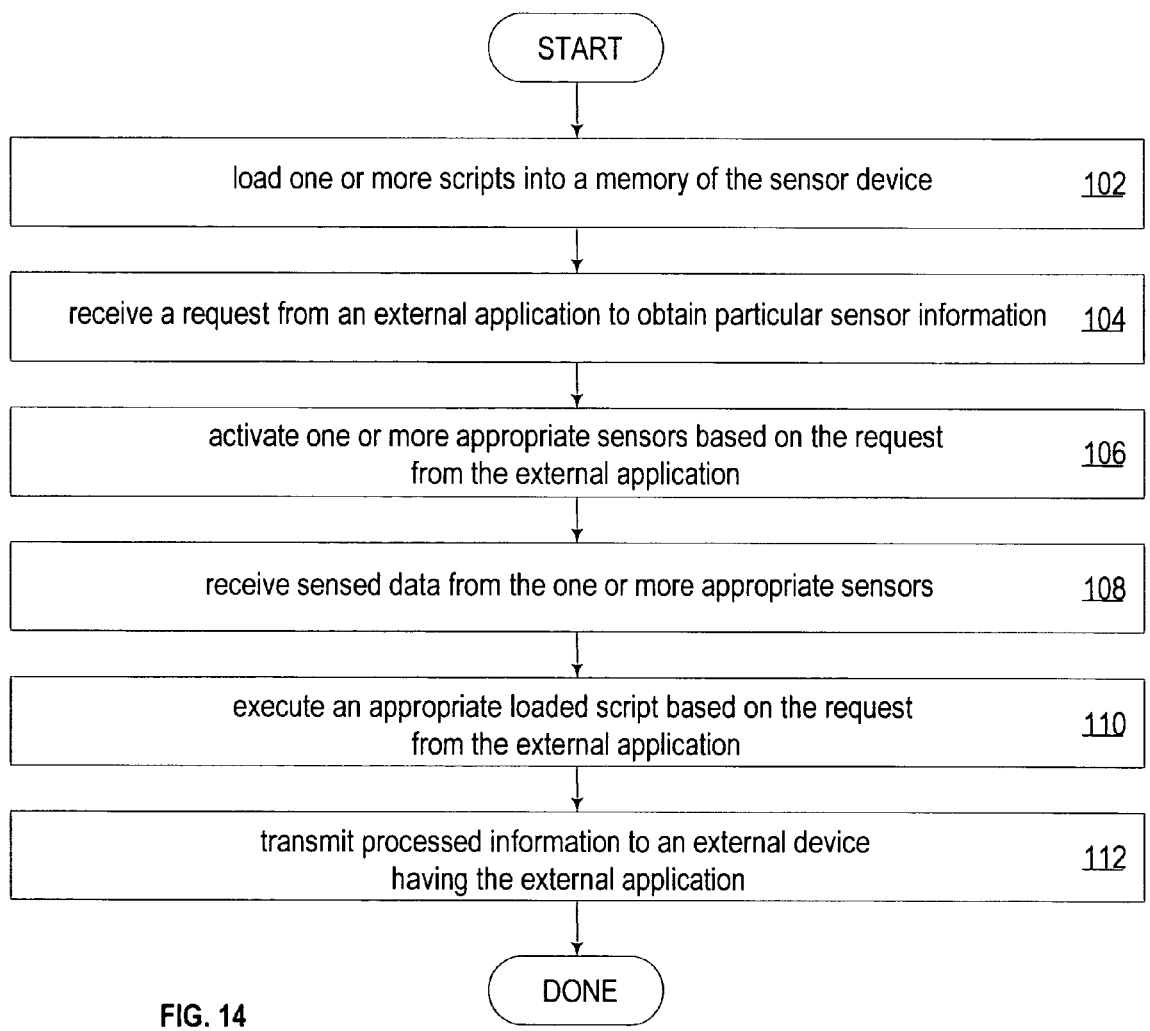
FIG. 14 is a flowchart of a simplified method for controlling a sensor device, in accordance with an embodiment of the present invention.

FIG. 14 is a flowchart of a simplified method for controlling a sensor device, in accordance with one embodiment of the present invention. Each step of the method is carried out by one or more sensor device components, which are described with reference to FIG. 1 to FIG. 13. For exemplary purposes, the steps of FIG. 14 are described as being carried out generally by the sensor device.

In this example, the method starts in step 102 where one or more scripts are loaded into a memory of the sensor device. At this point, other functions and parameters may also be loaded into the memory of the sensor device. The scripts are software programs that determine appropriate processes, parameters and function programs to be used for each external application that may send a request to the sensor device. The sensor device waits to receive a radio frequency request from an external application. If the sensor device receives no request, the sensor device operates in a low power mode to save available power supply.

However, in step 104, the sensor device may receive a request from an external application. The request may be to receive certain sensor information, such as hear rate or limb movement. In such a case, the sensor device activates one or more appropriate sensors based on the request from the external application in step 106. From the sensors, in step 108, the sensor device receives sensed data from the one or more appropriate sensors.

The sensor device then executes an appropriate loaded script based on the request from the external application in step 110. Step 110 may include converting the sensed data into converted sensed data having a format compatible with the external application, and processing the converted sensed data to obtain processed information.

Next, in step 112, the processed information is transmitted to the external device having the external application that made the request. The transmission may occur via wireless transmission, such as radio frequency transmission. Alternatively, the transmission may occur via wired transmission using, for example, a network like the Internet as a connection. Some header information, such as an identification (ID), is attached with the processed information. This header information allows a particular external application to determine which processed information is for that particular external application. Further, data packets that are transmitted in step 112 can be divided into smaller size sub-packets. These sub-packets may allow for a data transmission efficiency that comports with some predetermined communication protocol, such as transmission control protocol/internet protocol (TCP/IP), user datagram protocol (UDP), or another suitable protocol. In this example, the method is then done.

Other method steps for controlling the sensor device may include, but are not limited to, monitoring a power supply of the sensor device to determine an available power level for the sensor device, constructing a radio frequency controlling parameter table, constructing a process controlling parameter table, constructing a sensor control parameter table, and constructing a schedule for transmitting the processed information.

System And Method Implementation

Portions of the present invention may be conveniently implemented using a conventional general purpose or a specialized digital computer or microprocessor programmed according to the teachings of the present disclosure, as will be apparent to those skilled in the computer art.

FIG. 13 is a block diagram of software implementation of a sensor control method, in accordance with an embodiment of the present invention. In the CPU of the sensor device, a real-time multi-task operating system (not shown) runs. Task routines execute with a task management rule of the operating system. Examples of such task routines include process controller task PRCCTLTSK, radio frequency controller task RFCTLTSK, process 1 task PRC1TSK . . . process n task PRCnTSK, radio frequency communicator task RFTSK, sensor driver controller task DRVCTLTSK, and power monitor task PWRMONTSK. Driver routines are called by an interrupt routine in predetermined intervals. Examples of such driver routines include sensor driver 1 routine D1DRV . . . sensor driver n routine DnDRV.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, loading one or more scripts into a memory of the sensor device receiving a request from an external application to obtain particular sensor information, activating one or more appropriate sensors based on the request from the external application, receiving sensed data from the one or more appropriate sensors, and executing an appropriate loaded script based on the request from the external application, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for controlling a sensor device, the method comprising:
    loading one or more scripts into a memory of the sensor device;
    receiving a request from an external application;
    activating one or more sensors based on the request from the external application;
    receiving sensed data from the one or more sensors; and
    converting the sensed data into converted sensed data having a format compatible with the external application by executing a loaded script based on the request from the external application.

2. The method of claim 1, further comprising:
    processing the converted sensed data to obtain processed information by executing a loaded script based on the request from the external application.

3. The method of claim 2, further comprising transmitting the processed information to an external device having the external application, wherein the processed information satisfies the request from the external application.

4. The method of claim 1, further comprising monitoring a power supply of the sensor device to determine an available power level for the sensor device.

5. The method of claim 4, wherein based on the available power level and hardware ability of the sensor device, the method further comprises changing at least one of:
    a radio frequency transmission rate,
    a sampling frequency of the one or more sensors,
    a sensed data accuracy of the sensed data, and
    the loaded scripts.

6. The method of claim 4, further comprising constructing a radio frequency controlling parameter table based on at least one of:
    the available power level;
    a transmission distance between the sensor device and the external device; and
    hardware ability of the sensor device.

7. The method of claim 4, further comprising constructing a process controlling parameter table based on at least one of:
    the available power level;
    transmission ability; and
    performance of the processor.

8. The method of claim 4, further comprising constructing a sensor control parameter table based on at least one of:
    the available power level; and
    hardware ability of the sensor device.

9. The method of claim 4, further comprising constructing a schedule for transmitting the processed information based on at least one of:
    the available power level; and
    hardware ability of the sensor device.

10. A sensor device, comprising:
    a memory;
    a radio frequency communicator configured to receive signals from and transmit signals to an external device having an external application;
    a radio frequency controller configured to control the radio frequency communicator;
    a processor;
    a process controller configured to instruct the processor to load one or more scripts into the memory;
    a sensor; and
    a sensor driver controller configured to activate the sensor based on a request received from the external application,
    wherein the process controller is further configured to instruct the processor to execute a loaded script based on the request received from the external application to convert sensed data from the sensor into converted sensed data having a format compatible with the external application.

11. The sensor device of claim 10, wherein the processor is configured to process the converted sensed data according to the appropriate loaded script to obtain processed information.

12. The sensor device of claim 11, wherein the process controller is further configured to initiate transmitting of the processed information to the external device having the external application, wherein the processed information satisfies the request received from the external application.

13. The sensor device of claim 10, further comprising:
    a power supply; and
    a power supply monitor configured to monitor the power supply to determine an available power level for the sensor device, and further configured to send the available power level to at least one of the radio frequency controller, the sensor driver controller, and the process controller.

14. The sensor device of claim 13, wherein the radio frequency controller is further configured to construct a radio frequency controlling parameter table based on at least one of:
    the available power level;
    a transmission distance between the sensor device and the external device; and
    hardware ability of the sensor device.

15. The sensor device of claim 10, further comprising a sensed data selector configured to connect the sensed data to the loaded script.

16. The sensor device of claim 11, wherein the processor controller is further configured to instruct the processor to compress and encode the processed information.

17. The sensor device of claim 13, wherein the process controller is further configured to construct a process controlling parameter table based on at least one of:
    the available power level;
    transmission ability; and
    performance of the processor.

18. The sensor device of claim 13, wherein the sensor driver controller is configured to construct a sensor control parameter table based on at least one of:
    the available power level; and
    hardware ability of the sensor device.

19. The sensor device of claim 13, further comprising a scheduler configured to construct a schedule for transmitting processed information based on at least one of:
    the available power level; and
    hardware ability of the sensor device.

20. A computer-readable medium carrying one or more sequences of one or more instructions for controlling a sensor device, the one or more sequences of one or more instructions including instructions which, when executed by one or more processors, cause the one or more processors to perform the steps of:

loading one or more scripts into a memory of the sensor device;

receiving a request from an external application to obtain particular sensor information;

activating one or more sensors based on the request from the external application;

receiving sensed data from the one or more sensors; and executing a loaded script based on the request from the external application to convert the sensed data into converted sensed data having a format compatible with the external application.

\* \* \* \* \*